United States Patent
Yu et al.

(10) Patent No.: US 8,766,787 B2
(45) Date of Patent: Jul. 1, 2014

(54) SAFETY IMPROVEMENT METHOD OF IDLE STOP AND GO FUNCTION

(75) Inventors: Jiyong Yu, Pocheon-si (KR); Chongah Gwon, Hwaseong-si (KR); Junghwan Bang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 225 days.

(21) Appl. No.: 13/281,837

(22) Filed: Oct. 26, 2011

(65) Prior Publication Data

US 2012/0280806 A1 Nov. 8, 2012

(30) Foreign Application Priority Data

May 3, 2011 (KR) .................. 10-2011-0041966

(51) Int. Cl.
*B60Q 1/00* (2006.01)
*G06F 19/00* (2011.01)
*F02N 11/08* (2006.01)
*F02M 17/00* (2006.01)
*F02M 17/04* (2006.01)
*F02D 17/00* (2006.01)
*F02D 41/06* (2006.01)
*F02D 41/08* (2006.01)
*G07C 5/02* (2006.01)
*G07C 5/08* (2006.01)

(52) U.S. Cl.
CPC .............. *F02D 41/065* (2013.01); *F02D 41/08* (2013.01); *G07C 5/02* (2013.01); *G07C 5/08* (2013.01)
USPC ..... 340/439; 340/438; 123/179.3; 123/179.4; 123/198 D; 123/198 DB; 123/198 DC; 701/99; 701/101; 701/112

(58) Field of Classification Search
None
See application file for complete search history.

(56) References Cited

U.S. PATENT DOCUMENTS

| 6,799,546 | B1 * | 10/2004 | Gonring et al. | 123/179.3 |
|---|---|---|---|---|
| 7,082,914 | B2 * | 8/2006 | You, II | 123/179.4 |
| 7,657,366 | B2 * | 2/2010 | Guy et al. | 701/112 |
| 7,698,053 | B2 * | 4/2010 | Mori | 701/112 |
| 8,412,443 | B2 * | 4/2013 | Gibson | 701/112 |
| 8,417,435 | B2 * | 4/2013 | Yamaguchi | 701/102 |
| 8,527,145 | B2 * | 9/2013 | Yu et al. | 701/36 |
| 2005/0199209 | A1 * | 9/2005 | Shimokawa et al. | 123/179.4 |
| 2007/0112494 | A1 * | 5/2007 | Naik et al. | 701/55 |
| 2012/0138006 | A1 * | 6/2012 | Gwon et al. | 123/179.4 |

FOREIGN PATENT DOCUMENTS

| JP | 2001-227375 A | 8/2001 |
|---|---|---|
| JP | 2004-137916 A | 5/2004 |
| JP | 2007-211713 A | 8/2007 |
| KR | 10-0551306 B1 | 2/2006 |
| KR | 10-1013875 B1 | 2/2011 |

* cited by examiner

*Primary Examiner* — Julie Lieu
(74) *Attorney, Agent, or Firm* — Morgan, Lewis & Bockius LLP

(57) ABSTRACT

A safety improvement method of an Idle Stop and Go (ISG) function may include: recognizing initial conditions that senses whether an engine is restarted, when the engine is restarted by the ISG, and whether a driver operates a vehicle, and determines whether to warn the driver; warning the driver that makes the driver recognize that the engine is restarted if it is determined to warn the driver in recognizing initial conditions; and stopping the warning that stops warning the driver after warning the drive has been executed. Warning the drive may be achieved by an alarm generated from a buzzer for a predetermined time and a visual screen that is provided for the driver.

4 Claims, 1 Drawing Sheet

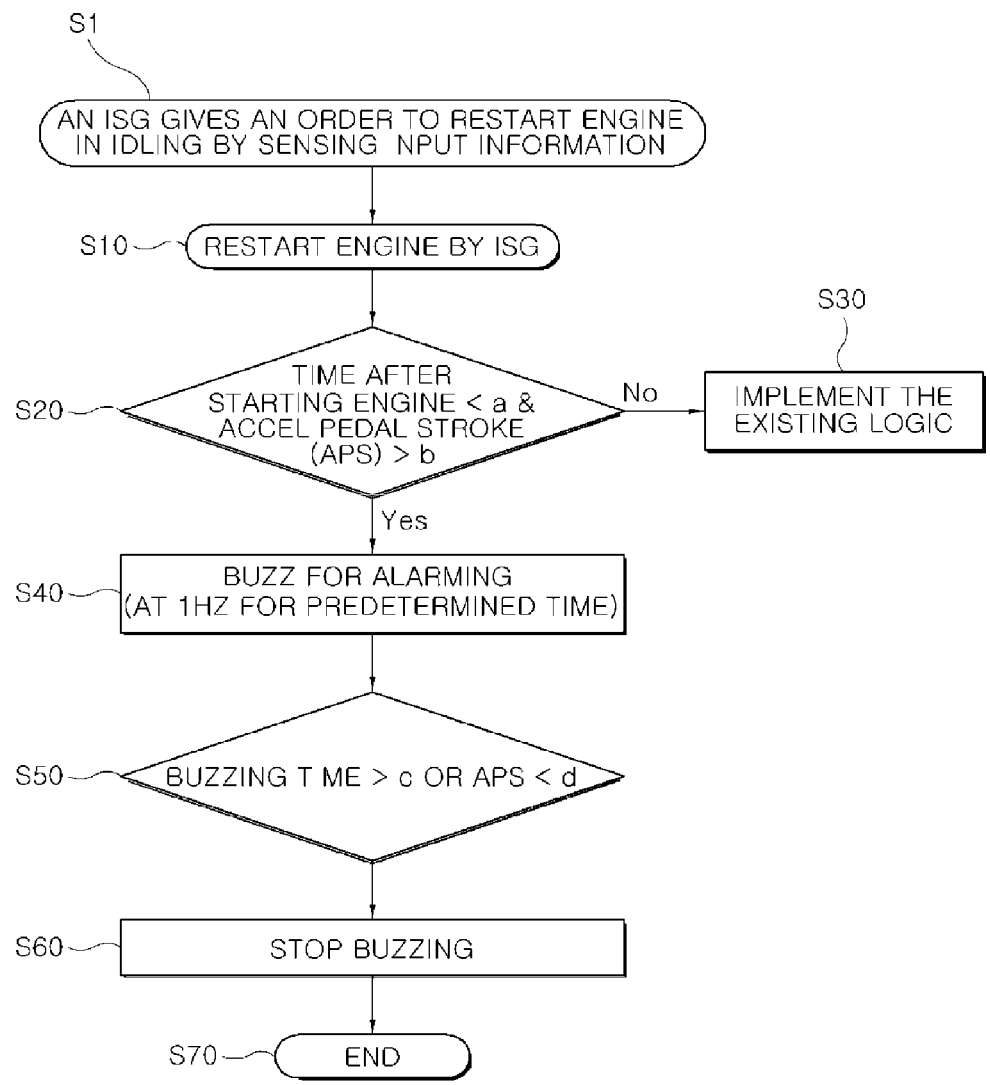

SAFETY IMPROVEMENT METHOD OF IDLE STOP AND GO FUNCTION

CROSS-REFERENCE TO RELATED APPLICATIONS loom The present application claims priority of Korean Patent Application Number 10-2011-0041966 filed May 3, 2011, the entire contents of which application is incorporated herein for all purposes by this reference.

BACKGROUND OF INVENTION

1. Field of Invention

The present invention relates to an idle stop and go logic, and more particularly, to a safety improvement method of an idle stop and go function which can help a driver correct driving habits to prevent sudden departure.

2. Description of Related Art

In general, an Idle Stop and Go (ISG) function is for controlling stopping of idling of an engine and makes it possible to achieve economical effect of fuel by repeating starting and stopping of an engine in accordance with road conditions.

For this function, an ISG logic gives an order to stop the engine in idling in response to input information, such as the vehicle speed, engine revolution speed, and the temperature of the cooling water and a vehicle provided with the ISG can achieve fuel saving of 5 to 15% in the actual fuel efficiency mode.

However, ensuring safety of the vehicle should be considered even if the vehicle is provided with the ISG in which the fuel efficiency is the first consideration, because driver's intention of driving and stopping of the vehicle coexist, such that it is required to actually cope with the fact.

For example, when there is no safety measure for sudden departure by restarting the engine that has been stopped by ISG, there may be possibility of sudden departure, in which, particularly, controlling of the transmission, and the engine and brake system or steering angle are not stable, such that a dangerous situation that the driver cannot expect is likely to occur.

Therefore, bad habits of the driver who frequently suddenly starts a vehicle cause risks that threaten safety and make durability and operability of the transmission worse.

In particular, an automatic transmission takes a predetermined time to keep the oil pressure of the transmission after the engine is restarted, such that when the vehicle is driven before the oil pressure for the automatic transmission is achieved, the clutch is damaged by the low oil pressure, and durability of the transmission is made worse, in addition to operability.

However, it is realistically impossible to consider various situations and conditions for ensuring safety of a vehicle provided with the ISG.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide a safety improvement method of an ISG (Idle Stop and Go) function that prevents deterioration of safety of a vehicle provided with the ISG due to sudden departure by warning the driver who restarts the engine with the ISG function such that the driver does not make sudden departure, and makes the driver correct bad driving habits that deteriorate safety by a learning effect.

Various aspects of the present invention provide a safety improvement method of an ISG (Idle Stop and Go) function, including: an initial condition recognizing step that senses whether an engine is restarted and a driver operates a vehicle to determine whether to warn the driver, when the engine is restarted by the ISG; a driver warning step that makes the driver recognize that the engine is restarted when it is required to warn the driver after the initial condition recognizing step; and/or a warning stopping step that stops warning the driver after the driver warning step.

In the initial condition recognizing step, the restarted state of the engine restarts a time passage and whether the driver operates the vehicle is admitted by the pressing-down of the acceleration pedal.

The restarted state of the engine is maintained when the restarting time passage of the engine exceeds a driver recognition time or the acceleration pedal is not pressed down.

The warning in the driver warning step may include an alarm from a buzzer or other suitable warning devices, and/or a visual screen that is provided for the driver.

The stopping of warning in the warning stopping step determines an alarm generation time passage and whether the acceleration pedal is released, and stops the alarm if the generation time passage of the alarm exceeds the predetermined driver's recognition time or the acceleration pedal is released.

According to various aspects of the present invention, it is possible to prevent a driving habit of sudden departure by allowing a driver to recognize restarting with ISG (Idle Stop and Go) through a warning and improve durability and operability of a transmission, in addition to ensuring safety of a vehicle, by correcting a driver's bad habit of sudden departure that deteriorates safety of the vehicle by a repetitive learning effect through a warning.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a flowchart for an exemplary safety improvement method of an idle stop and go function according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a logic for improving Idle Stop and Go (ISG) safety is executed when an engine is restarted by ISG.

As in step S10, the engine is restarted when conditions for restarting an engine according to the ISG are satisfied. In step S20, it is determined that the amount of time that has passed after the engine is started and whether the drive has pressed down the acceleration pedal. APS in the flowchart stands for Acceleration Pedal Stroke.

The amount of time 'a' that has passed after the engine is started is a specific value for time passage, which depends on the types of vehicle and is not specified, and the APS 'b' shows that the acceleration pedal is pressed down, that is, the APS>b means that the acceleration pedal is kept pressed down by the driver.

In step S20, when time passage<a and APS>b are not satisfied after the engine is started, the ISG safety improvement logic does not proceed any more but goes to the existing ISG logic, as in step S30.

That is, time passage>a after the engine is started shows that a predetermined time has passed after an order of starting the engine is given, in which the vehicle is in a stable sate, and APS<b means that the driver does not press down the acceleration pedal.

Herein, the existing ISG logic means that the ISG logic is executed without warning the driver that the engine is restarted by the ISG, according to various embodiments, in execution of the ISG logic.

However, when time passage<a and a pressing-down stroke of the acceleration pedal>b are satisfied after the engine is started in step S20, the ISG safety improvement logic is continued as in step S40 and the driver is warned that the engine is restarted by the ISG.

A method of warning the driver of this situation may be implemented in various ways, but a method that makes an alarm of about 1 Hz for a predetermined time is used in various embodiments while a screen that allows the driver to visually recognize the situation is also provided.

The alarm is made by a buzzer or other suitable devices/systems and the predetermined time implies a time for which a driver can generally recognize the buzzer sound.

After an alarm is generated by the buzzer for the predetermined time, the passage amount of generation time of the alarm is determined as in step S50 while releasing of the APS is determined again.

'c' means time passage for which the driver can generally recognize the buzzer sound, which is a specific value for the generation time passage of the alarm and 'd' means that the pressing-down of the acceleration pedal is released, such that APS<d means releasing of the APS.

In step S50, when the alarm generation time passage>c or the pressing-down stroke of APS<d, the alarm is stopped as in step S60, which is implemented under the assumption that the driver sufficiently recognizes restarting of an engine by the ISG and does not operate the acceleration pedal.

Next, step S70 shows that the safety improvement method of ISG function according to various embodiments has been completed.

As described above, according to various embodiments of the present invention, it is possible to prevent a driver from suddenly starting a vehicle. This can be achieved by warning the driver that the vehicle has been restarted by the ISG when the driver intends to unconsciously or reflectively press down the acceleration pedal to restart the engine by the ISG. As such, it increases safety of the vehicle by correcting a driver's bad driving habit of sudden departure of the driver by a repetitive learning effect through an alarm. Moreover, it particularly prevents deterioration of durability and operability of the transmission by a shock due to sudden departure.

For convenience in explanation and accurate definition in the appended claims, the terms "stop", "go", "press-down", and etc. are used to describe features of the exemplary embodiments with reference to the functions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A safety improvement method of an Idle Stop and Go (ISG) function, comprising:
   recognizing initial conditions that include:
      sensing whether an engine is restarted, when the engine is restarted by the ISG, and whether a driver operates a vehicle; and
      determining whether to warn the driver;
   warning the driver that makes the driver recognize that the engine is restarted if it is determined to warn the driver in recognizing initial conditions; and
   stopping the warning after the warning of the driver has been executed, wherein in recognizing initial conditions, a restarted state of the engine restarts a time passage and the driver operating the vehicle is admitted when the driver presses down an acceleration pedal; and
   wherein the restarted state of the engine is maintained when the restarting time passage of the engine exceeds a driver recognition time or the acceleration pedal is not pressed down.

2. The method as defined in claim 1, wherein warning the driver is achieved by an alarm generated from a buzzer for a predetermined driver's recognition time.

3. The method as defined in claim 2, wherein warning the driver further includes a visual screen that is provided for the driver.

4. A safety improvement method of an Idle Stop and Go (ISG) function, comprising:
   recognizing initial conditions that include:
      sensing whether an engine is restarted, when the engine is restarted by the ISG, and whether a driver operates a vehicle; and
      determining whether to warn the driver;
   warning the driver that makes the driver recognize that the engine is restarted if it is determined to warn the driver in recognizing initial conditions; and stopping the warning after the warning of the driver has been executed, wherein warning the driver is achieved by an alarm generated from a buzzer for a predetermined driver's recognition time;

determining a generation time passage of the alarm, and whether the pressed-down acceleration pedal is released; and stopping the alarm if the generation time passage of the alarm exceeds the predetermined driver's recognition time or the acceleration pedal is released.

* * * * *